(12) United States Patent
Yamashita et al.

(10) Patent No.: US 8,959,256 B2
(45) Date of Patent: Feb. 17, 2015

(54) PERIPHERAL EQUIPMENT AND PARALLEL BUS SYSTEM

(75) Inventors: Toshiyuki Yamashita, Tokyo (JP); Yuji Hiraoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/813,109

(22) PCT Filed: Nov. 11, 2010

(86) PCT No.: PCT/JP2010/006622
§ 371 (c)(1),
(2), (4) Date: Jan. 29, 2013

(87) PCT Pub. No.: WO2012/063290
PCT Pub. Date: May 18, 2012

(65) Prior Publication Data
US 2013/0132615 A1    May 23, 2013

(51) Int. Cl.
*G06F 3/00* (2006.01)
*G06F 5/00* (2006.01)
*G06F 13/42* (2006.01)
*G06F 13/14* (2006.01)

(52) U.S. Cl.
CPC .......... *G06F 13/4204* (2013.01); *G06F 13/14* (2013.01)

USPC ............................................... 710/16; 710/43

(58) Field of Classification Search
USPC ................................................. 710/9, 16, 43
See application file for complete search history.

(56) References Cited

U.S. PATENT DOCUMENTS

| | | | |
|---|---|---|---|
| 6,246,255 B1 * | 6/2001 | Takizawa | 326/30 |
| 6,424,871 B1 * | 7/2002 | Nakajima et al. | 700/11 |
| 6,442,636 B1 | 8/2002 | Lin et al. | |
| 6,801,027 B2 * | 10/2004 | Hann et al. | 323/282 |
| 2003/0048759 A1 | 3/2003 | Cara | |
| 2006/0158433 A1 * | 7/2006 | Serban et al. | 345/168 |
| 2009/0249090 A1 * | 10/2009 | Schmitz et al. | 713/300 |

FOREIGN PATENT DOCUMENTS

| | | |
|---|---|---|
| JP | 2001-43182 A | 2/2001 |
| JP | 2003-99387 A | 4/2003 |
| JP | 3714111 B2 | 11/2005 |

* cited by examiner

*Primary Examiner* — Farley Abad
(74) *Attorney, Agent, or Firm* — Birch, Stewart, Kolasch & Birch, LLP

(57) ABSTRACT

Bus lines 20, 21 are connected to peripheral devices 1, 2 such that the polarities of the bus lines are replaced with each other according to an attachment position, and information acquisition units 16-1, 16-2 determine an attachment position P1 if the polarities of a connector terminal 10-1 (or 10-2) and a connector terminal 11-1 (or 11-2) are plus and minus, and determines an attachment position P2 if minus and plus.

7 Claims, 13 Drawing Sheets

| Connector | Position P1 | Position P2 | Position P3 | Position P4 |
|---|---|---|---|---|
| Terminal 10 | + | + | − | − |
| Terminal 11 | − | − | + | + |
| Terminal 30 | + | − | + | − |

|  | Connector Terminal 10 | Connector Terminal 11 |
|---|---|---|
| Attachment Position P1 | Bus Line 20 | Bus Line 21 |
| Attachment Position P2 | Bus Line 21 | Bus Line 20 |

FIG.3
|  | Terminal 14 | Terminal 15 | Terminal 17 | Terminal 18 |
|---|---|---|---|---|
| Peripheral Device 1 | + | − | − | + |
| Peripheral Device 2 | + | − | + | − |
FIG.4
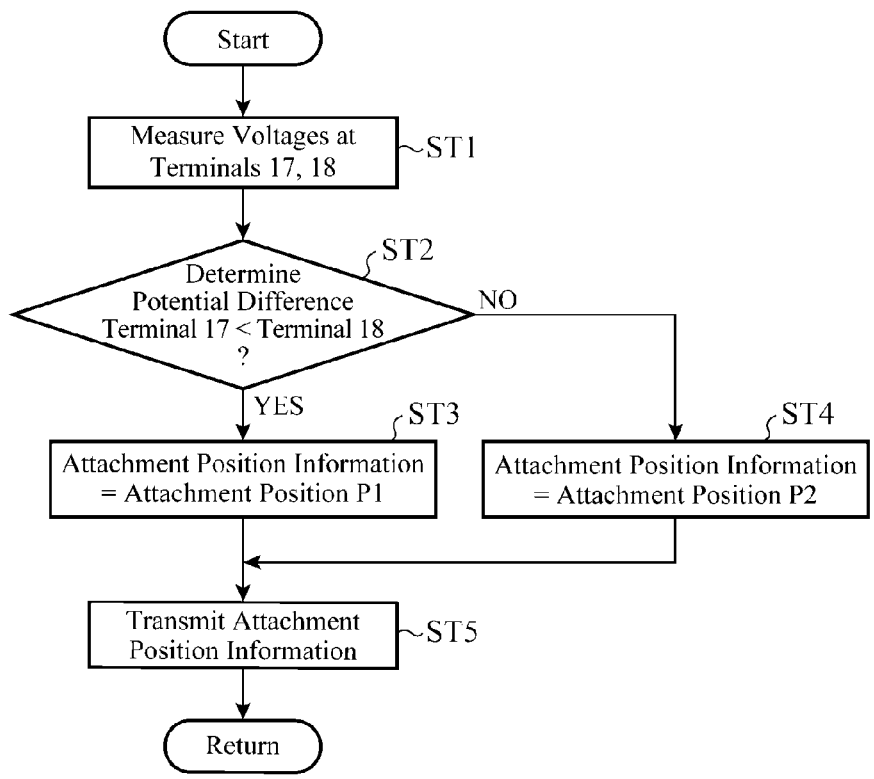
FIG.5
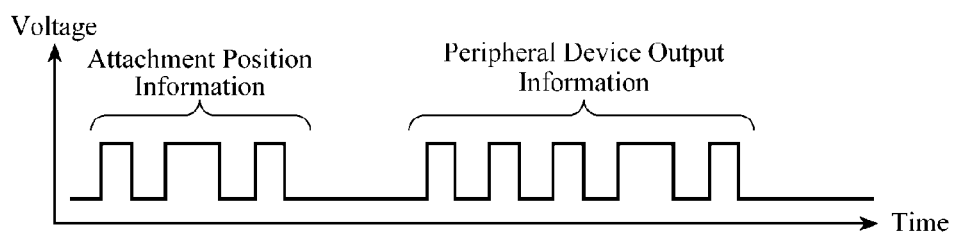

FIG.11
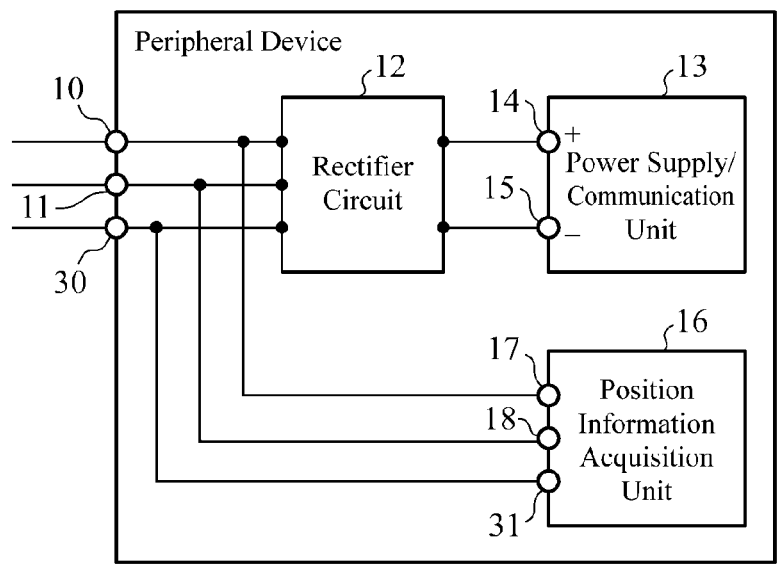
FIG.12
| Connector | Position P1 | Position P2 | Position P3 | Position P4 |
|---|---|---|---|---|
| Terminal 10 | + | + | − | − |
| Terminal 11 | − | − | + | + |
| Terminal 30 | + | − | + | − |
FIG.13
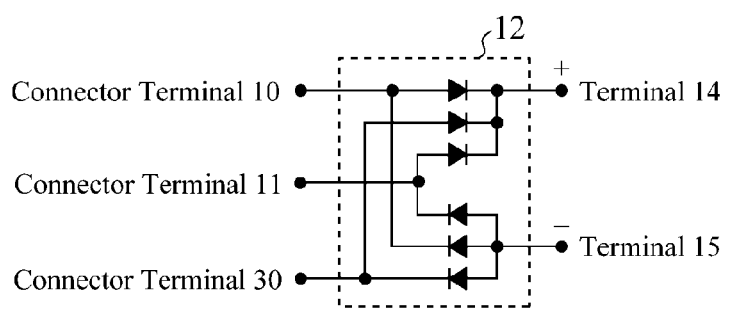

(a)

(b)

PERIPHERAL EQUIPMENT AND PARALLEL BUS SYSTEM

TECHNICAL FIELD

The present invention relates to a peripheral device connected to a control device with a parallel bus, and a parallel bus system connecting the control device to the plurality of peripheral devices.

BACKGROUND ART

When a control device is connected to a peripheral device, there are a serial bus system in which peripheral devices (peripheral equipment) 1, 2 are connected to a control device 100 in a string as shown in FIG. 19(a) (for example, see Patent Document 1), and a parallel bus system in which wiring is branched to connect the peripheral devices 1, 2 as shown in FIG. 19(b) (for example, see Patent Document 2). In this connection, FIG. 19(a) and FIG. 19(b) each illustrate an example of two bus lines.

In the serial bus system as illustrated in FIG. 19(a), a connection in a string is provided such that the peripheral device 1 is connected to the control device 100, and that the peripheral device 2 are connected to the peripheral device 1. In this system, each of the peripheral devices sets in itself an ID number provided to the data received from the previous peripheral device (or the control device), and also updates and transmits the ID number for the next peripheral device. Therefore, the peripheral device can identifies its own attachment position, such that the peripheral device connected to the control device 100 is identified as the peripheral device 1 at an attachment position P1, the peripheral device connected to the peripheral device 1 at the attachment position P1 is identified as the peripheral device 2 at an attachment position P2, and the peripheral device that is connected to the peripheral device 2 at the attachment position P2 but is different from the peripheral device 1 at the attachment position P1 is identified as the peripheral device at an attachment position P3 (not shown). Thus, it is possible for the peripheral devices having the identical specification to be available, and the peripheral devices can be connected without checks of the attachment positions.

However, the serial bus system cannot be connected to the next peripheral device without going through a certain peripheral device and therefore a wiring loss such as redundancy of a wiring part going to and returning from the peripheral device arises as compared with the parallel bus system. Further, since the serial bus system has the peripheral devices each having an input terminal and an output terminal separately, it needs to have terminals twice as many as those of a parallel bus system that can combine them as an input/output terminal, resulting in an increased cost. In addition, the wirings of the peripheral devices are connected in a string; thus, when a partial disconnection thereof occurs, the subsequent peripheral devices become unable to communicate. For a countermeasure for the disconnection, there is a method such that the final peripheral device may be connected to the control device, which further leads to the wiring loss.

On the other hand, in the parallel bus system as shown in FIG. 19(b), a branching is carried out on a wiring without going through a peripheral device, and therefore a connection thereof is possible with the shortest wiring. In addition, the connection terminals for the peripheral device can be achieved with a minimum number of terminals to communicate with the control device.

However, when peripheral devices with an identical specification are connected in the parallel bus system, the peripheral devices are connected to the control device under electrically identical conditions, and therefore the control device is unable to recognize which peripheral device is connected to which attachment position.

PRIOR ART DOCUMENTS

Patent Documents

Patent Document 1: Japanese Patent Publication No. 3714111

Patent Document 2: Japanese Patent Application Publication No. 2001-43182

SUMMARY OF THE INVENTION

As mentioned above, the conventional parallel bus system has advantages such as a low wiring loss and a reduced number of terminals as compared with the serial bus system; however, there is a problem such that the attachment position of the peripheral device cannot be recognized. In the case where the parallel bus system is mounted on the vehicle and so on, the peripheral devices are arranged at specific attachment positions, and it is often required to comprehend which attachment position the peripheral device output information transmitted from the peripheral device to the control device is transmitted from. Therefore, in order to enable the control device to recognize the attachment positions of the peripheral devices, a differentiation such as setting ID information in the peripheral devices is required. In that case, it is required that a peripheral device with a different specification for each attachment position is installed and connected to a parallel bus, which poses a problem that the specification of the peripheral devices cannot be unified. Then, if the peripheral device is installed at a wrong position upon attachment, the control device side falsely recognizes the peripheral device output information transmitted from an attachment position that is different from a proper one, which may lead to a serious inconvenience.

An aspect of embodiments of the present invention is made to solve the aforementioned problems, and an object of the invention is to provide a peripheral device and a parallel bus system which make it possible to recognize the attachment position of the peripheral device while retaining the advantages of the parallel bus system such as the low wiring loss and the reduced number of connector terminals.

A peripheral device according to an aspect of embodiments of the invention includes: a terminal for receiving the supply of a physical amount different from that at a terminal of another peripheral device via a bus line connected to a control device or a bus line branched from the corresponding bus line; and a position information acquisition unit for determining the attachment position of the corresponding peripheral device by calculating the physical amounts supplied to the two or more terminals of the peripheral device and informing the control device of the determination result.

In addition, a parallel bus system according to an aspect of embodiments of the invention is configured by connecting the above peripheral device to the control device via a parallel bus line.

According to an aspect of embodiments of the invention, the attachment position of the corresponding peripheral device is determined and transmitted to the control device, and therefore, the peripheral device capable of recognizing its own attachment position can be provided while retaining the advantages of the parallel bus system such as the low wiring loss and the reduced number of connector terminals.

In addition, according to an aspect of embodiments of the invention, the peripheral device transmits the attachment information of the corresponding peripheral device to the control device, and therefore the parallel bus system can be provided, which can differentiate the attachment position of the peripheral device on the control device side while retaining the advantages such as the low wiring loss and the reduced number of connector terminals.

BRIEF DESCRIPTION OF THE DRAWINGS

FIG. 3 is a diagram showing an example of voltages at terminals of a power supply/communication unit and terminals of a position information acquisition unit in the peripheral devices shown in FIG. 1.

FIG. 4 is a flowchart showing an operation of the position information acquisition unit according to Embodiment 1.

FIG. 5 is a diagram showing an example of attachment position information and peripheral device output information transmitted by the peripheral device.

FIG. 11 is a block diagram showing a modification of the parallel bus system according to Embodiment 1, in which three types of bus lines are used.

FIG. 12 is a diagram showing a relationship between attachment positions and voltages of connector terminals in the peripheral device shown in FIG. 11.

FIG. 13 is a diagram showing an example of a circuit configuration of a rectifier circuit in the peripheral device shown in FIG. 11.

FIG. 19 is a diagram for illustrating a conventional bus system, in which FIG. 19(a) shows a serial bus system and FIG. 19(b) shows a parallel bus system.

BEST MODE FOR CARRYING OUT THE INVENTION

In the following, in order to describe the present invention in more detail, embodiments for carrying out the invention will be described with reference to the attached drawings.
Embodiment 1.

Figure 1:
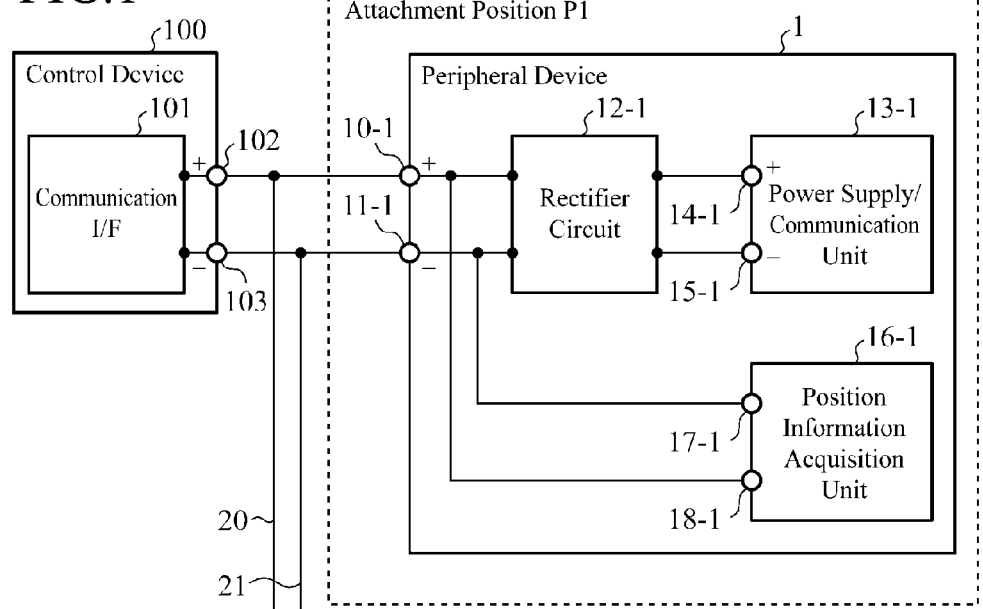
FIG. 1 is a block diagram showing a configuration of a parallel bus system according to Embodiment 1 in the present invention.

As illustrated in FIG. 1, a parallel bus system according to Embodiment 1 is composed of a control device 100, a peripheral device 1 attached at an attachment position P1, a peripheral device 2 attached at an attachment position P2, and bus lines 20, 21. For example, when an air bag activation system of a vehicle is achieved with the parallel bus system, an ECU (Electronic Control Unit) is used as the control device 100, and acceleration sensors attached at predetermined attachment positions P1, P2 in the vehicle are used as peripheral devices 1, 2. Also, when an obstacle detection system of a vehicle is achieved, an ECU is similarly used as the control device 100, and ultrasonic sensors attached at predetermined attachment positions P1, P2 in the vehicle are used as the peripheral devices 1, 2. Of course, Embodiment 1 is applicable to any system for connecting the control device and the peripheral device, notwithstanding an entity other than the vehicle.

The control device 100 has a communication interface (hereafter, referred to as the communication I/F) 101 for making an interconversion between digital and analog signals, and inputting and outputting the signals, a connector terminal 102 to which a bus line 20 is connected, and a connector terminal 103 to which a bus line 21 is connected. In the illustrated example, it is configured that power is directly supplied from the control device 100 to peripheral devices 1, 2; the communication I/F 101 provides a potential difference between the bus lines 20 and 21 such that the bus line 20 has a positive potential while the bus line 21 has a negative potential, and the power supply to the peripheral devices 1, 2 is ensured by the potential difference in concurrence with communication. Specifically, each of the bus lines 20, 21 serves as a communication line as well as a power supply line. The bus lines 20, 21 each are branched off midway, and connected to the peripheral device 1 and 2.

The peripheral device 1 has connector terminals 10-1, 11-1 to which the bus lines 20, 21 are connected, a rectifier circuit 12-1, a power supply/communication unit 13-1 and its terminals 14-1, 15-1, and a position information acquisition unit 16-1 and its terminals 17-1, 18-1. The peripheral device 2 has the same specification as that of the peripheral device 1, and has connector terminals 10-2, 11-2 to which the bus lines 20, 21 are connected, a rectifier circuit 12-2, a power supply/communication unit 13-2 and its terminals 14-2, 15-2, and a position information acquisition unit 16-2 and its terminals 17-2, 18-2.

The rectifier circuits 12-1 and 12-2 are identical to each other, and therefore, in the following description, they are simply referred to as the rectifier circuit 12 without discrimination in the case where a part common to the rectifier circuits 12-1 and 12-2 is described. Likewise, the connector terminals 10-1 and 10-2 are referred to as the connector terminal 10, the connector terminals 11-1 and 11-2 as the connector terminal 11, the power supply/communication units 13-1 and 13-2 as the power supply/communication unit 13, the terminals 14-1 and 14-2 as the terminal 14, the terminals 15-1 and 15-2 as the terminal 15, the position information acquisition units 16-1 and 16-2 as the position information acquisition unit 16, the terminals 17-1 and 17-2 as the terminal 17, and the terminals 18-1 and 18-2 as the terminal 18.

Figure 2:
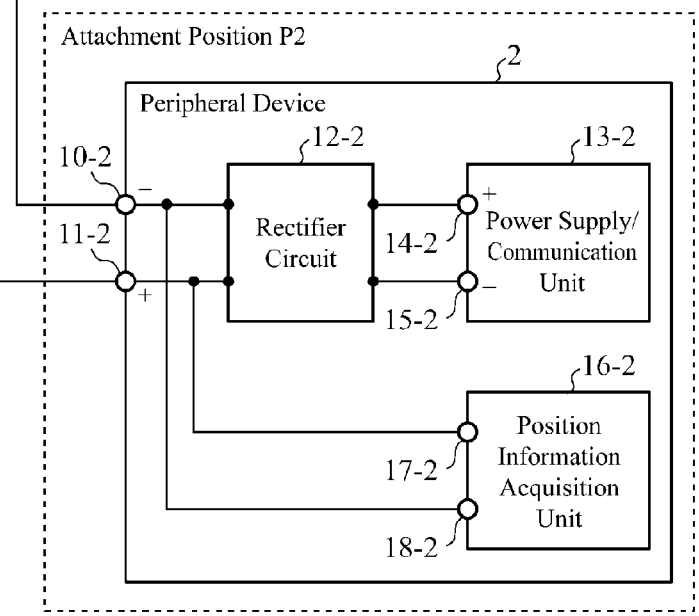
FIG. 2 is a diagram showing an example of position specifying data specifying a connection relationship between connector terminals and bus lines at attachment positions in peripheral devices shown in FIG. 1.

In Embodiment 1, the terminals of the peripheral device are wired such that different bus lines are allocated thereto for each attachment position. Specifically, the bus line 20 is connected to the connector terminal 10-1 of the peripheral device 1 arranged at the attachment position P1, while the bus line 21 is connected to the connector terminal 11-1. The bus line 21 is connected to the connector terminal 10-2 of the peripheral device 2 arranged at the other attachment position P2, while the bus line 20 is connected to the connector terminal 11-2. FIG. 2 shows a connection relationship between the connector terminals 10, 11 and the bus lines 20, 21 at the attachment positions P1, P2.

It is noted that the connectors (not shown) of the bus lines have different terminal shapes between those connected to the connector terminals 10 and those connected to the connector terminals 11, so that they can be connected to the connectors of the peripheral devices 1, 2 only with correct polarities. For this reason, there is no possibility that the connection patterns of the bus lines are wrong.

As mentioned above, depending on the attachment positions, the plus and minus of the bus lines 20, 21 connected to the connector terminals 10, 11 may be reversed, resulting in a reversed polarity state thereof. FIG. 3 shows voltages at the terminals 14, 15 of the power supply/communication unit 13 and at the terminals 17, 18 of the position information acquisition unit 16. The terminal 17 of the position information acquisition unit 16 is connected to the connector terminal 11, while the terminal 18 is connected to the connector terminal 10. The position information acquisition unit 16 measures voltages, currents and so on as physical amounts at the connector terminals 10, 11 (i.e. the terminals 18, 17), determines which bus line is connected to which terminal according to the measurement results, and identifies the attachment position based on the determination results. However, it is assumed that in order to identify the attachment position, the position specifying data of the attachment positions and bus lines as shown in FIG. 2 is set in the position information acquisition unit 16.

FIG. 4 is a flowchart illustrating an example of operation of the position information acquisition unit 16, and the following description will be given of an example in which a voltage is measured as the physical amount. The position information acquisition unit 16 first measures voltages at the terminals 17 and 18 (step ST1), and determines a potential difference therebetween (step ST2).

When the voltage at the terminal 17 is lower than the voltage at the terminal 18 ("YES" in step ST2), it can be determined that the plus bus line 20 is connected to the connector terminal 10 and the minus bus line 21 is connected to the connector terminal 11. In this case, the attachment position can be identified as the attachment position P1 by back-calculation from the position specifying data shown in FIG. 2 (step ST3).

In contrast, when the voltage at the terminal 17 is equal to or higher than that at the terminal 18 ("NO" in step ST2), it can be determined a state such that the minus bus line 21 is connected to the connector terminal 10 and that the plus bus line 20 is connected to the connector terminal 11. In this case, the attachment position can be identified as the attachment position P2 by back-calculation from the position specifying data shown in FIG. 2 (step ST4).

Subsequently, the position information acquisition unit 16 transmits, to the control device 100, information of the identified attachment position P1 or the attachment position P2 together with peripheral device output information output by the power supply/communication unit 13 (step ST5). FIG. 5 shows an example of the transmitted information. In the example of FIG. 5, the attachment position information is used as an ID for the peripheral device, and transmitted together with the other information.

Since the attachment position information is received together with the peripheral device output information in the control device 100, it can be recognized which of the peripheral device 1 at the attachment position P1 and the peripheral device 2 at the attachment position P2 is the transmission source of the peripheral device output information. On the other hand, when the ID is transmitted as the attachment position information, the control device 100 may recognize the attachment position by referring to the correspondence relationship between the IDs and attachment positions to be set therein.

Figure 6:
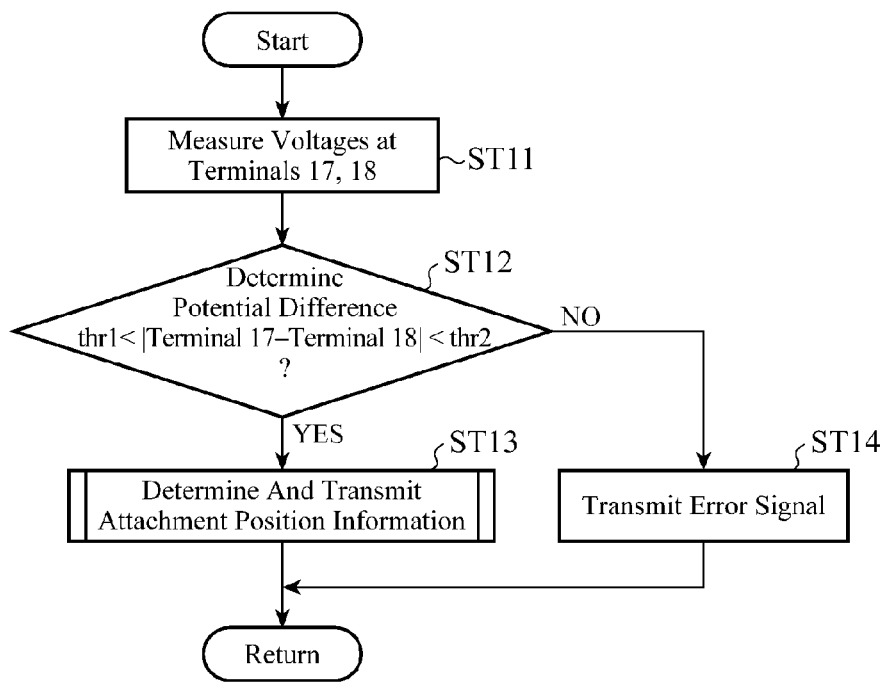
FIG. 6 is a flowchart showing a failure detection operation of the position information acquisition unit according to Embodiment 1.

In addition to the function to identify the attachment position, the position information acquisition unit 16 may have a function to detect and transmit a voltage failure such as a communication error with the control device 100. The operation in that case is shown in FIG. 6. The position information acquisition unit 16 first measures voltages at the terminals 17 and 18 (step ST11), and determines whether or not a potential difference between them is within a preset range (a range from a threshold thr1 to a threshold thr2) (step ST12). Then, if the potential difference is within the range ("YES" in step ST12), the position information acquisition unit 16 performs, in the following step ST13, the same processing as those in steps ST2 to ST5 in FIG. 4 to identify the attachment position and transmits the resultant to the control device 100. In contrast, if the potential difference is out of the range ("NO" in step ST12), the position information acquisition unit 16 transmits an error signal to the control device 100 (step ST14).

As mentioned above, depending on the attachment positions, the plus and minus of the bus lines 20, 21 connected to the connector terminals 10, 11 are reversed, which may cause the reverse polarity of the power supply. The reverse polarity gives rise to inconvenience to the power supply, and therefore, in order to avoid the inconvenience, a rectifier circuit 12 is arranged between the connector terminals 10, 11 and the power supply/communication unit 13. The rectifier circuit 12 is a circuit to apply the power supply with normal polarity to the power supply/communication unit 13 regardless of the connection polarities of the bus lines 20, 21. Two examples of a specific circuit configuration of the rectifier circuit 12 are shown in FIG. 7(a) and FIG. 7(b). The rectifier circuit 12 of FIG. 7(a) is a circuit composed of four diodes, and the rectifier circuit 12 shown in FIG. 7(b) is a circuit composed of two resistors and two diodes; however, a circuit having a configuration except them may be provided. It is noted that there is an advantage that the configuration of FIG. 7(b) can reduce the number of diodes rather than that of FIG. 7(a).

When the rectifier circuit 12 is arranged between the connector terminals 10, 11 and the power supply/communication unit 13, plus is supplied to the terminals 14-1, 14-2 of the power supply/communication units 13-1, 13-2, while minus is supplied to the terminals 15-1, 15-2, even when the plus bus line 20 is connected to the connector terminal 10-1, and the minus bus line 21 is connected to the connector terminal 11-1, or to the contrary, even when the minus bus line 20 is connected to the connector terminal 10-2 and the plus bus line 21 is connected to the terminal 11-2. This is shown in FIG. 1 and FIG. 3. In such a way, both of the power supply/communication units 13-1, 13-2 are provided with the normal polarity, and the power supply thereof can be ensured.

In the case of Embodiment 1 in which each of the bus lines 20, 21 serves as both of a power supply line and a communication line, the power supply/communication unit 13 is provided to serve as both of a power supply unit and a communication unit. The function of the power supply/communication unit 13 as a power supply unit is as mentioned above, and the function as a communication unit is to transmit the peripheral device output information to the control device 100 according to the voltages or currents of the bus lines 20, 21, or according to a pattern of difference in voltage or current between the bus lines 20, 21.

As described above, according to Embodiment 1, like a conventional parallel bus system, each of the peripheral devices 1, 2 has only to have two connector terminals. In contrast, in a conventional serial bus system, four connector terminals are required.

Also, according to Embodiment 1, like the conventional parallel bus system, each of the peripheral devices 1, 2 is connected to the control device 100, resulting in a reduced wiring loss. In contrast, in the conventional serial bus system, the peripheral devices 1, 2 are connected in a string, resulting in a wiring loss.

Further, in the parallel bus system of Embodiment 1, unlike the conventional parallel bus system, each of the peripheral devices 1, 2 can identify its own attachment position P1 or P2 and inform the control device 100 of the resultant.

Hereupon, referring to FIG. 8, a modification of the parallel bus system according to Embodiment 1 will be described. When current communication is performed through the use of the bus lines 20, 21, as shown in FIG. 1, the communication unit and the power supply unit in the power supply/communication unit 13 can share the rectifier circuit 12; however, when a communication unit and a power supply unit are provided separately, each of them may be provided with a rectifier circuit. In the case of the configuration of FIG. 8, a power supply unit 13a and a communication unit 13b are provided separately, and rectifier circuits 12a and 12b are arranged at the front stages of the power supply unit 13a and the communication unit 13b, respectively. As in the configuration of FIG. 8, rectifier circuits 12a-1, 12a-2 set the polarities of terminals 14a-1, 14a-2 of power supply units 13a-1, 13a-2 to plus and the polarities of terminals 15a-1, 15a-2 thereof to minus. Likewise, rectifier circuits 12b-1, 12b-2 set the polarities of terminals 14b-1, 14b-2 of communication units 13b-1, 13b-2 to minus and the polarities of terminals 15b-1, 15b-2 to plus.

Also, referring to FIG. 9, another modification of the parallel bus system according to Embodiment 1 will be described. In the case where the power supply unit 13a and the communication unit 13b are provided separately, when the power supply for the power supply unit 13a is secured, all the components in the peripheral devices 1, 2 operate normally. Therefore, it is configured that the communication unit 13b acquires plus and minus connection patterns of the bus lines 20, 21 from the normally operating position information acquisition unit 16, and outputs a signal in which plus and minus are switched in accordance with the connection patterns. In such a way, the rectifier circuit for the communication unit 13b can be no longer needed.

Figure 9:
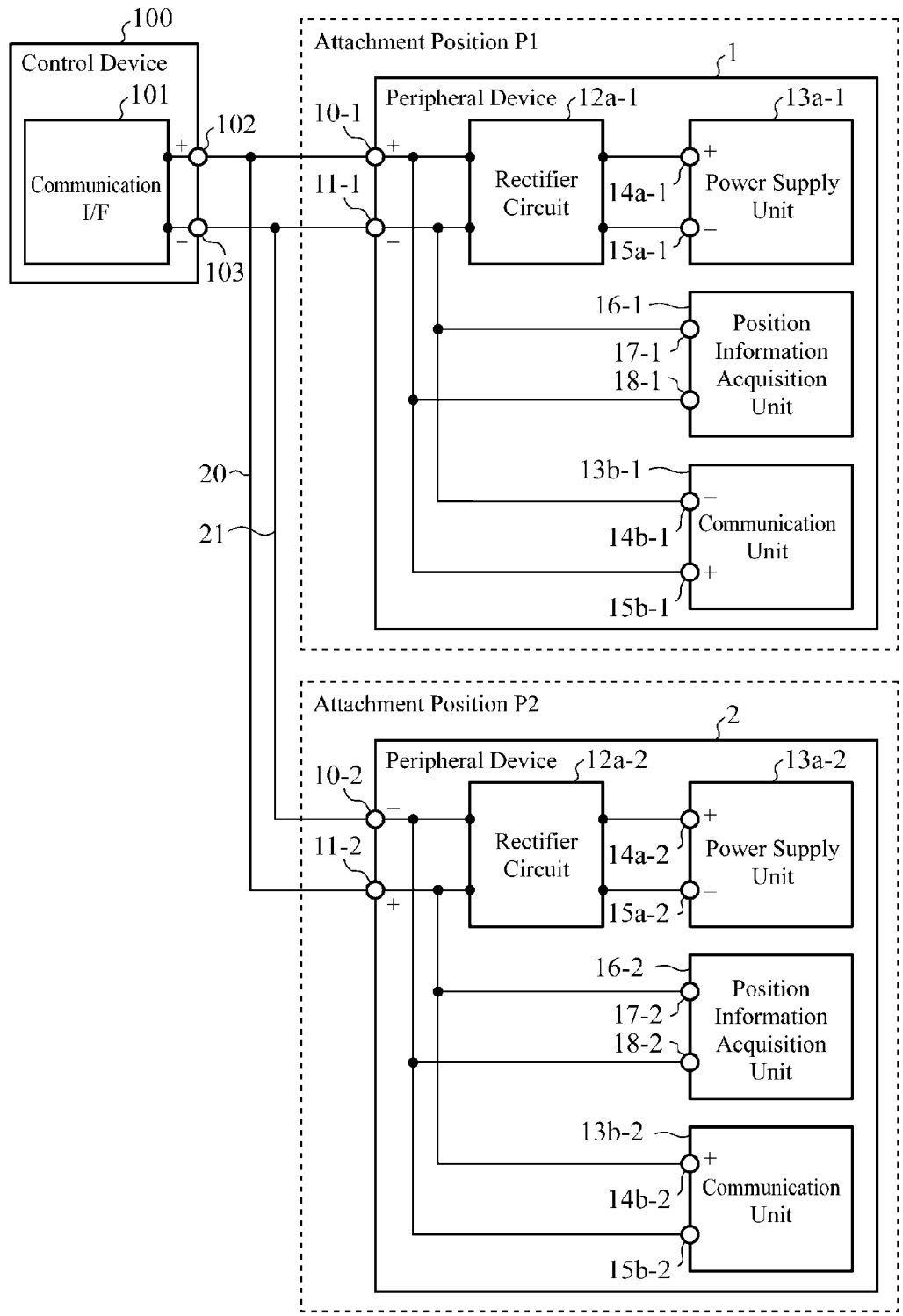
FIG. 9 is a block diagram showing a modification of the parallel bus system according to Embodiment 1, in which a power supply unit and a communication unit are configured separately and only the power supply unit is provided with a rectifier circuit.

In the case of the configuration of FIG. 9, in the peripheral device 1, it is determined by the position information acquisition unit 16-1 that the connector terminal 10-1 is connected to the plus bus line 20, and that the terminal 11-1 is connected to the minus bus line 21, and therefore the communication unit 13b-1 acquires the corresponding connection pattern and transmits a signal such that the output from the terminal 14b-1 becomes minus and that the output from the terminal 15b-1 becomes plus. In the other peripheral device 2, it is determined by the position information acquisition unit 16-2 that the connector terminal 10-2 is connected to the minus bus line 21, and that the terminal 11-2 is connected to the plus bus line 20, and therefore the communication unit 13b-2 acquires the connection pattern and transmits a signal such that the output from the terminal 14b-2 becomes plus and the output from the terminal 15b-2 becomes minus.

As stated above, when the communication unit 13b changes the output method according to the connection pattern, the correspondence with a variety of communication systems becomes possible.

Figure 8:
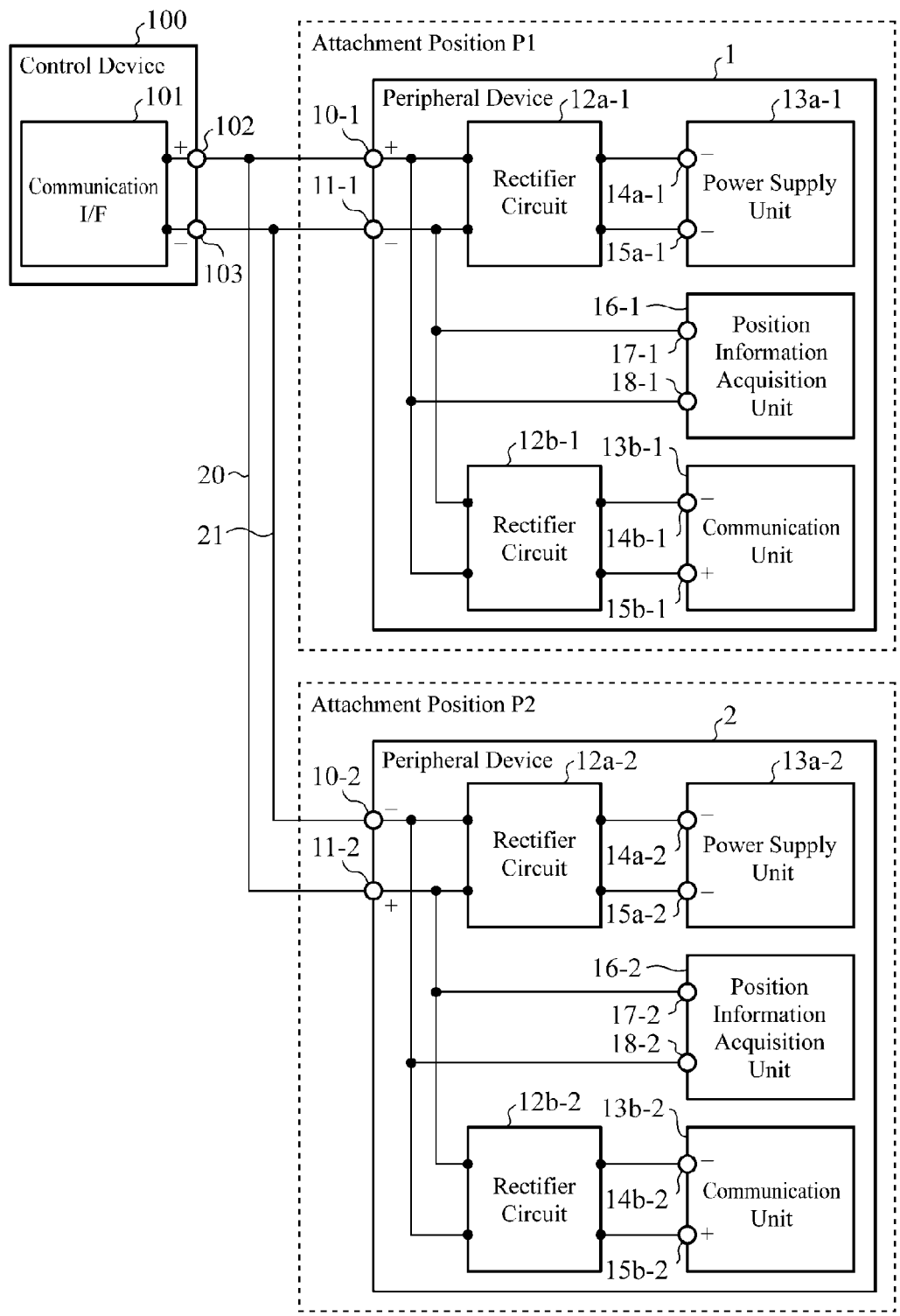
FIG. 8 is a block diagram showing a modification of the parallel bus system according to Embodiment 1, in which a power supply unit and a communication unit are configured separately and each are provided with a rectifier circuit.

Although the two types of bus lines are shown in the configuration examples of FIG. 1, FIG. 8 and FIG. 9, the invention is not limited to these.

Figure 10:
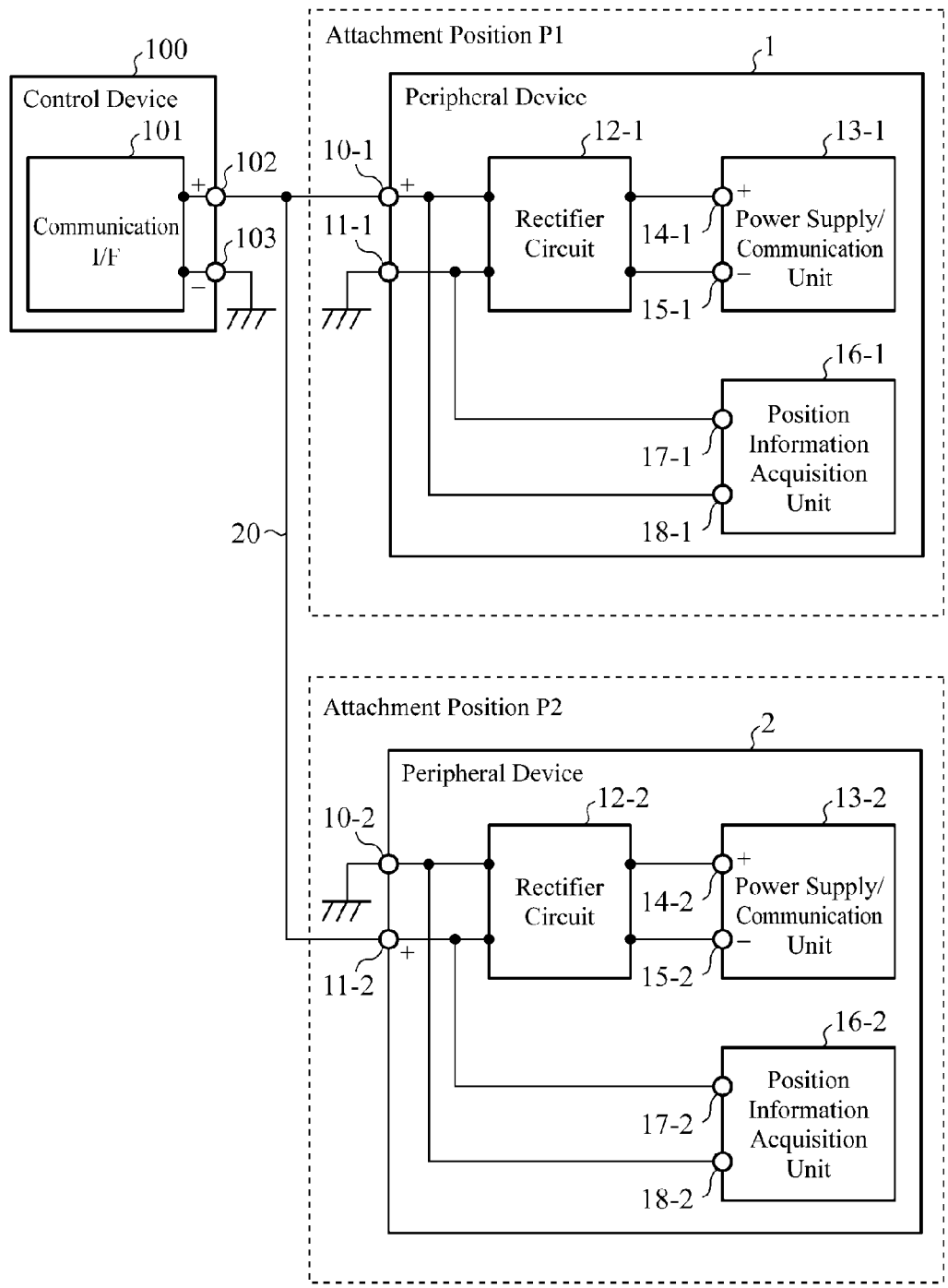
FIG. 10 is a block diagram showing a modification of the parallel bus system according to Embodiment 1, in which one type of bus lines is used.

FIG. 10 shows a configuration example of a parallel bus system in which a single type of bus line is used. For example, when the parallel bus system is applied to a vehicle and so on, the bus system can use the ground in common with the system of the vehicle system. In this case, as shown in FIG. 10, the following have only to be achieved: the plus bus line 20 is connected to the connector terminals 102, 10-1, 11-2, and the connector terminals 103, 10-2, 11-1 are grounded; as in the configuration shown in FIG. 1, the position information acquisition unit 16 measures the voltages or currents at the connector terminals 10, 11, and determines the attachment position according to the connection pattern.

In addition, as in FIGS. 8 and 9, also in FIG. 10, a power supply unit and a communication unit can be configured separately.

FIG. 11 shows a configuration example of a peripheral device in the case where three types of bus lines are provided. When three types of bus lines are used, as shown in FIG. 11, the following have only to be achieved: the peripheral device is also provided with three connector terminals 10, 11, 30, and respective bus lines are connected thereto; the position information acquisition unit 16 is also provided with three terminals 17, 18, 31 which are connected to the connector terminals 10, 11, 30, respectively; then, the position information acquisition unit 16 measures the voltages or currents as stated above, determines which bus line of plus and minus is connected to the connector terminals 10, 11, 30, and determines the attachment position according to the connection pattern. FIG. 12 shows a connection relationship between terminals and bus lines at attachment positions. In this case, four different positions P1 to P4 can be distinguished based on the combinations between plus and minus of the voltages supplied to the connector terminals 10, 11, 30. Specifically, at most four of the peripheral device as shown in FIG. 11 can be connected to the control device 100. The one peripheral device is connected to the bus line connected to the control device 100, while the other three peripheral devices are connected to the control device 100 via the bus lines branched from the corresponding bus line.

Figure 7:
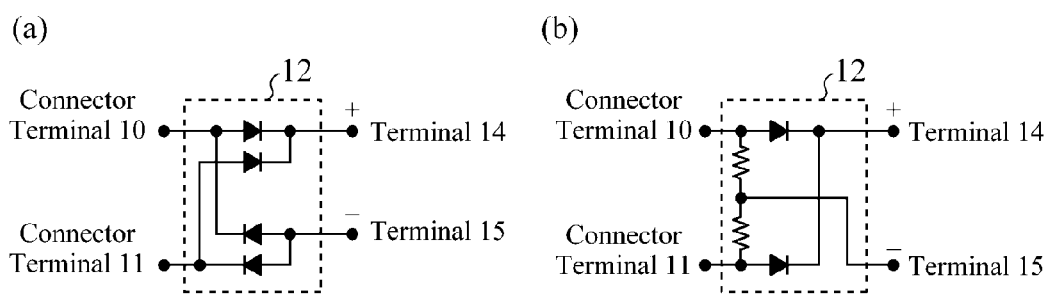
FIG. 7 is a diagram showing an example of a circuit configuration of a rectifier circuit in the peripheral device shown in FIG. 1.

In addition, when a three-terminal rectifier circuit 12 having a circuit configuration as illustrated in FIG. 13 is arranged, like the two-terminal rectifier circuit 12 shown in FIG. 7, power is supplied with normal polarities as follows, regardless of the connection patterns of the bus lines: plus is supplied to the terminal 14 of the power supply/communication unit 13, and minus is supplied to the terminal 15, and thus the power supply can be secured.

Figure 14:
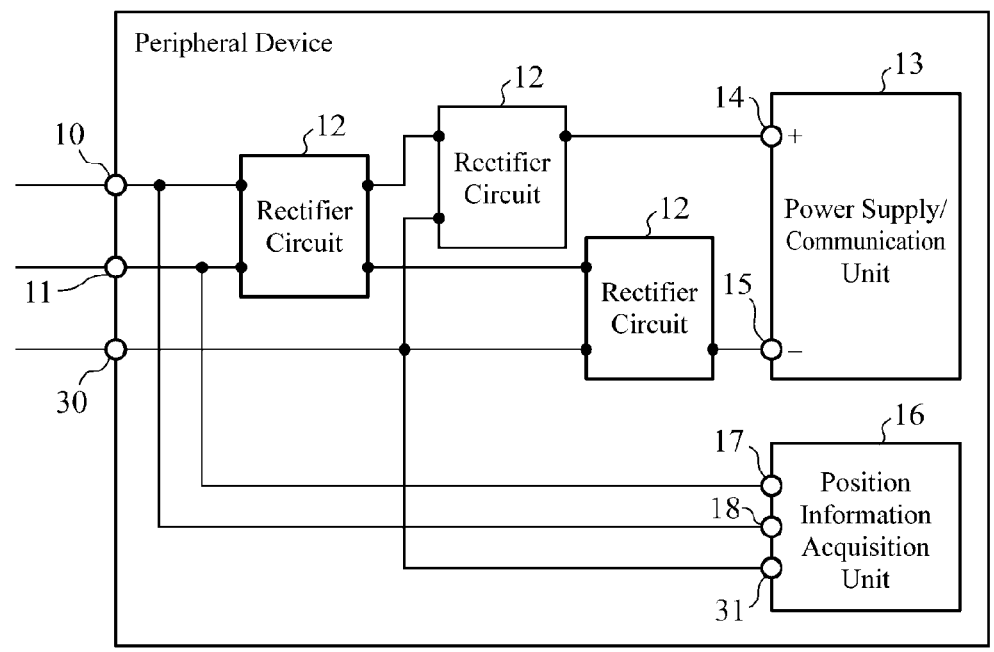
FIG. 14 is a block diagram showing a modification of the peripheral device according to Embodiment 1, in which three types of bus lines are used and an additional rectifier circuit is provided.

Further, when the rectifier circuits are added as shown in FIG. 14, eight attachment positions can be distinguished.

It is also possible to provide four or more connector terminals to increase the number of connection patterns and further increase the number of distinguishable attachment positions, but a description thereof will be omitted.

As described above, in the parallel bus system according to Embodiment 1, each of the peripheral devices 1, 2 is configured to have the connector terminals 10, 11 for receiving the supply of the physical amounts different from those at the connector terminals of the other peripheral device via the parallel bus lines 20, 21 connected to the control device 100 or the bus lines 20, 21 branched from the corresponding bus lines 20, 21, and the position information acquisition unit 16 that determines the attachment position of the corresponding peripheral device based on the physical amounts (e.g. voltage) supplied to the connector terminals 10, 11, and informs the control device 100 of the determination result; specifically, it is configured that the plurality of connector terminals 10, 11 provided with the corresponding peripheral device are connected to the plurality of bus lines 20, 21 in an arbitrary combination, and receive the supply of the physical amounts in a combination different from those at the connector terminals of the other peripheral device, and that the position information acquisition unit 16 determines the attachment position of the corresponding peripheral device based on the combination of the physical amounts supplied to the plurality of connector terminals 10, 11.

For this reason, it is possible to provide the peripheral device capable of recognizing its own attachment position with retaining the advantages of the parallel bus system such as the low wiring loss and the reduced number of the connecter terminals of the peripheral device. Further, an employment of such a peripheral device can provide the parallel bus system in which the control device side can also recognize the attachment positions of the peripheral devices. As mentioned above, according to Embodiment 1, since the low wiring loss thereof is performed, it is especially suitable for a bus system to be installed in an environment such as a vehicle with a low degree of freedom in wiring in which wiring is carried out with conforming a chassis shape thereof or avoiding an in-vehicle apparatus.

Also, in the parallel bus system according to Embodiment 1, it is configured that each of the peripheral devices 1, 2 includes a power supply/communication unit 13 (or a power supply unit 13a) for receiving the power supply from the connector terminals 10, 11, and a rectifier circuit 12 which is arranged between the connector terminals 10, 11 and the power supply/communication unit 13 (or the power supply unit 13a) to convert the power supply of the connector terminals 10, 11 to the normal polarity, and then supply the resultant to the power supply/communication unit 13 (or the power supply unit 13a). For this reason, the supply of the power to the power supply/communication unit 13 (or the power supply unit 13a) can be ensured, regardless of the polarity of the power supply to the connector terminals 10, 11 supplied by the bus lines 20, 21.

Also, in the parallel bus system according to Embodiment 1, it is configured that the position information acquisition unit 16 of the peripheral devices 1, 2 informs error information of the control device 100 when the physical amounts (e.g. potential difference) of the connector terminals 10, 11 exceed a predetermined range. In the event that there occurs a communication difficulty and/or a power failure between the peripheral device and the control device 100, the difficulty and/or failure can be detected, and further the occurrence of the difficulty and/or failure can be informed to the control device 100.

Also, in the parallel bus system according to Embodiment 1, the plurality of peripheral devices 1, 2 connected to the control device 100 can be configured with the same specification. Due to the same specification, the cost thereof is not increased, and also since there is no trouble such that the specification of the peripheral device is selected in accordance with the attachment position to be attached thereto, no false attachment thereof occurs. Also, even in the case of the same specification thereof, the plurality of connector terminals 10, 11 provided for each of the peripheral devices 1, 2 can be connected to the plurality of bus lines 20, 21 in an arbitrary combination to receive the supply of the physical amounts in a combination different from those at the connector terminals of the other peripheral device, and the position information acquisition unit 16 provided for each of the peripheral devices 1, 2 determines the attachment position of the corresponding peripheral device based on the combination of the physical amounts supplied to the plurality of connector terminals 10, 11, and therefore the peripheral devices 1, 2 can be electrically differentiated with respect to the control device 100, so that the attachment position thereof can be discriminated.

It is noted that in the above Embodiment 1, a configuration example in which power is directly supplied from the control device 100 to the peripheral devices 1, 2 is described, but the invention is not limited to this; even in the case where power is supplied to the peripheral devices 1, 2 independently, the same effects as the above can be expected when wiring is carried out such that the connection of the bus lines is different for each peripheral device; however, since this matter is obvious, a description thereof will be omitted.

Embodiment 2.

Figure 15:
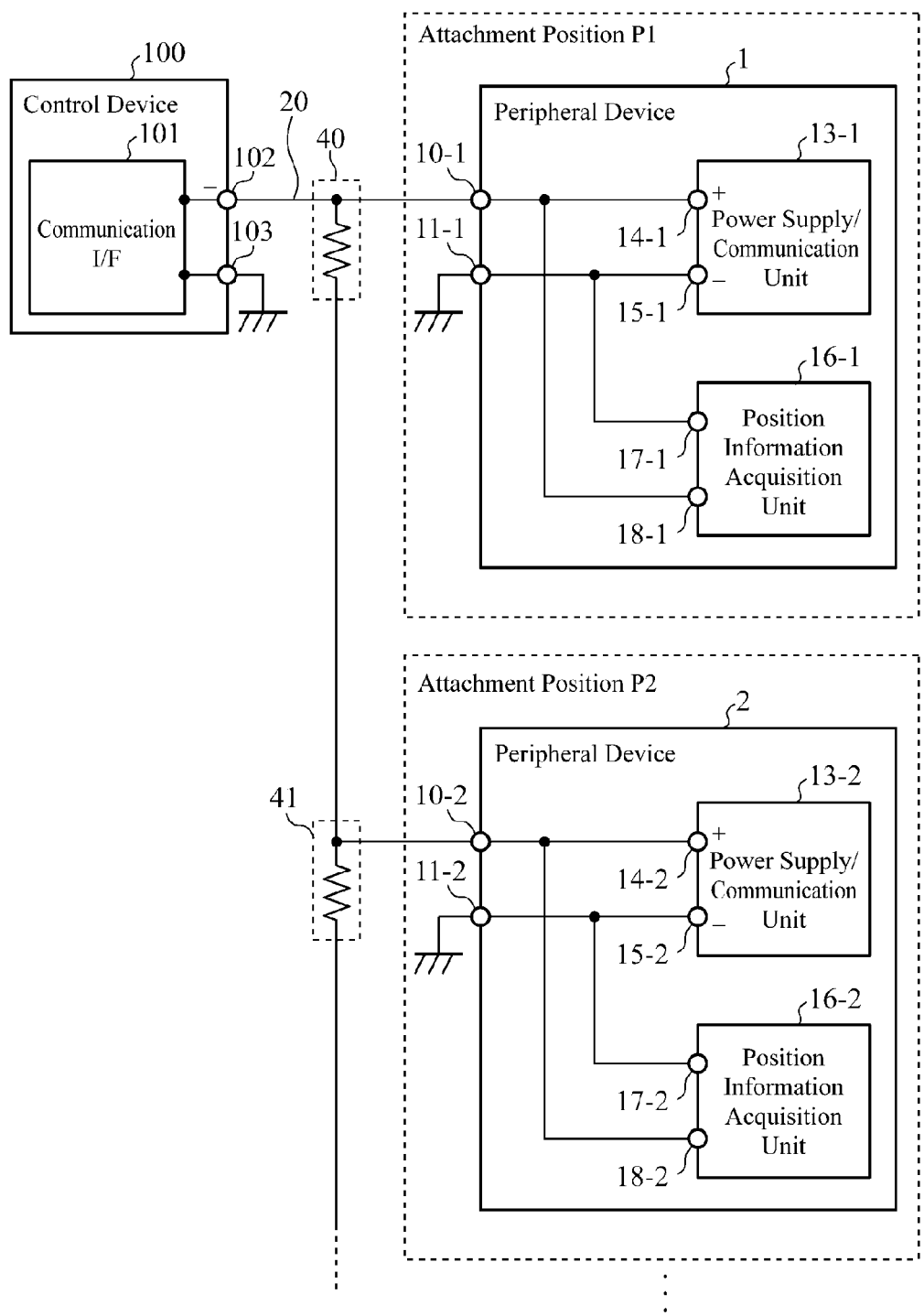
FIG. 15 is a block diagram showing a configuration of a parallel bus system according to Embodiment 2 in the invention.

FIG. 15 is a block diagram showing a configuration of a parallel bus system according to Embodiment 2. In FIG. 15, the same or equivalent parts as or to those in FIG. 1 are denoted by the same reference numerals, and a description thereof will be omitted.

As shown in FIG. 15, the parallel bus system according to Embodiment 2 is composed of a control device 100, a peripheral device 1 attached to an attachment position P1, a peripheral device 2 attached to an attachment position P2, and a bus line 20, and a voltage drop element such as a resistor 40 is connected on a line branched off from the bus line 20 toward the peripheral device 2.

A connector terminal 102 of the control device 100 is connected to the bus line 20, while a connector terminal 103 is grounded.

A connector terminal 10-1 of the peripheral device 1 is connected to the bus line 20 and a connector terminal 11-1 is grounded. Likewise, in the other peripheral device 2, a connector terminal 10-2 is connected to the bus line 20 and a connector terminal 11-2 is grounded. Hereinafter, when the components denoted by the same reference numerals are described for their common parts, like the connector terminals 10-1, 10-2 and so on, they will be collectively referred to simply as the connector terminal 10 without distinction.

Since the resistor 40 is arranged on the line branched from the bus line 20, the voltage applied to the peripheral device 2 is lower than the voltage applied to the peripheral device 1 by the bus line 20. Specifically, the connector terminal 10-2 of the peripheral device 2 receives the supply of a voltage that is different from that at the connector terminal 10-1 of the other peripheral device 1 via the resistor 40 connected on the bus line 20 branched from the bus line 20 connected to the control device 100.

Figure 16:
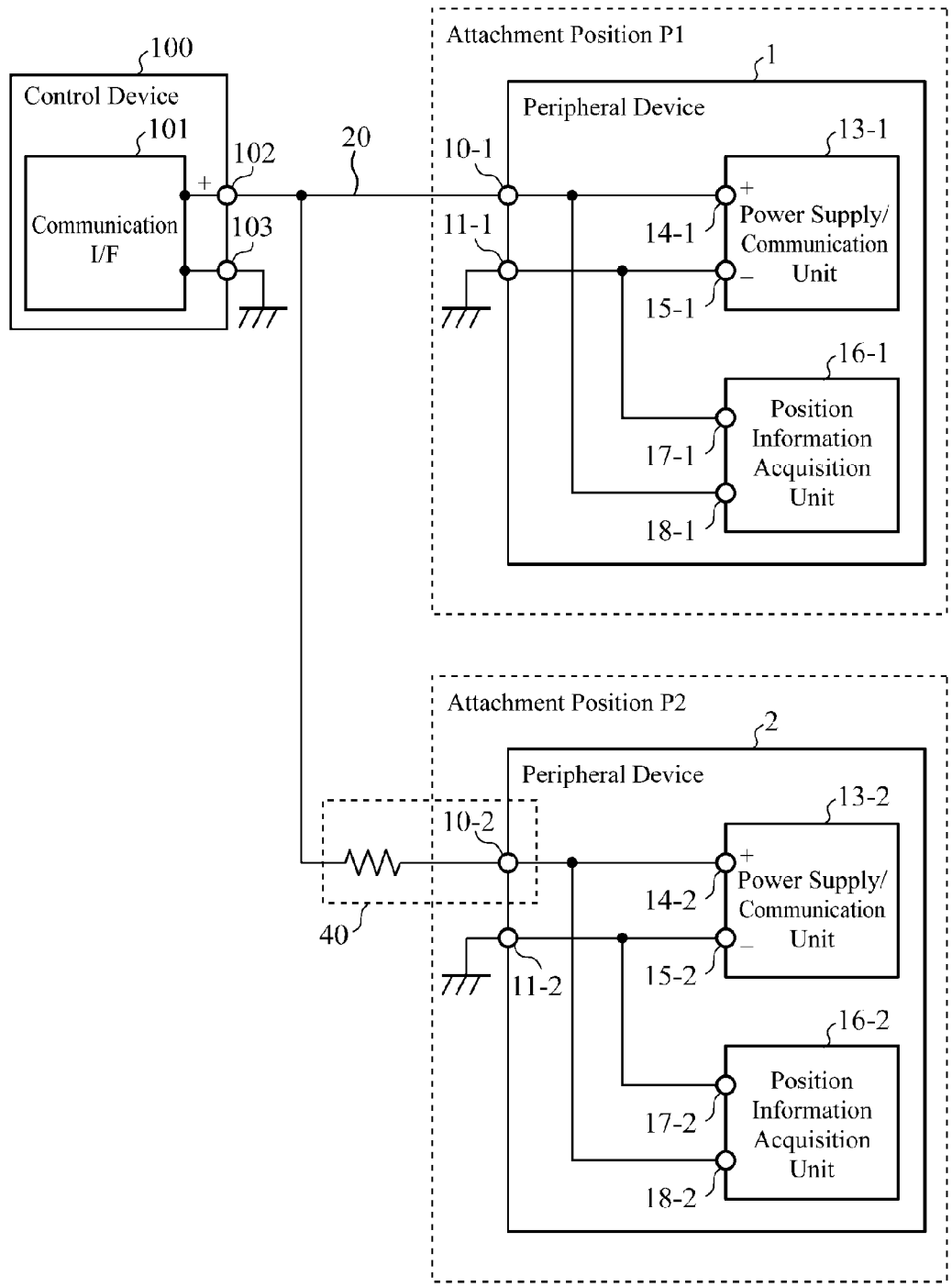
FIG. 16 is a block diagram showing a modification of the parallel bus system according to Embodiment 2, in which the position of a resistor 40 is changed.

It is noted that the arranged position of a voltage drop element such as the resistor 40 is not limited to that of FIG. 15, but it may be arranged, as shown in FIG. 16, for example, within a connector (not shown) for connecting the peripheral device 2 and the bus line 20.

In a position information acquisition unit 16 according to Embodiment 2, a terminal 17 is connected to the connector terminal 11, and terminal 18 is connected to the connector terminal 10. Then, the position information acquisition unit 16 measures the voltage at the connector terminal 10 (i.e., the terminal 18), determines, based on the measurement result, which bus line is connected to which terminal, and identifies the attachment position based on the determination result.

Figure 17:
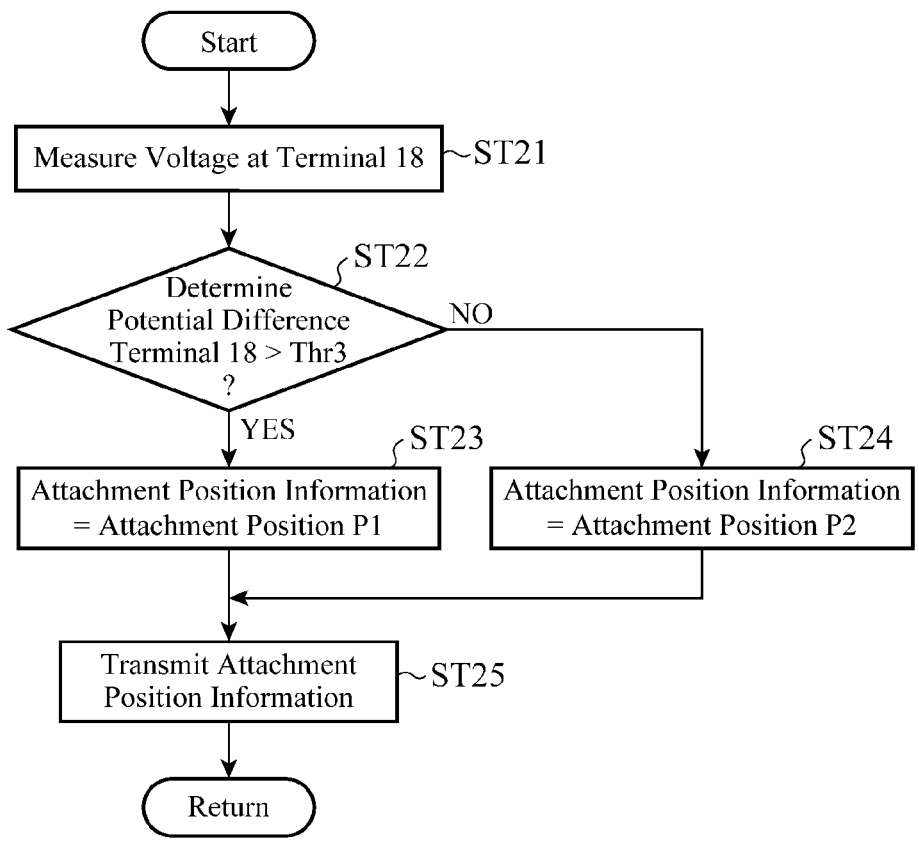
FIG. 17 is a flowchart showing an operation of a position information acquisition unit according to Embodiment 2.

FIG. 17 is a flowchart illustrating an example of operation of the position information acquisition unit 16. The position information acquisition unit 16 first measures the voltage at the terminal 18 (step ST21), and compares the voltage at the terminal 18 with a predetermined threshold thr3 (step ST22). The threshold thr3 is a voltage value to determine whether the resistor 40 is provided or not, and is a value according to a degree of voltage drop by the resistor 40.

When the voltage at the terminal 18 is higher than the threshold thr3 ("YES" in step ST22), it can be determined a state such that there is no drop of voltage due to the resistor 40 arranged on the bus line 20. Therefore, the position information acquisition unit 16 can identify the attachment position P1 (step ST23). In contrast, when the voltage at the terminal 18 is the threshold thr3 or lower ("NO" in step ST22), it can be determined a state such that there is a certain drop of voltage due to the resistor 40 arranged on the bus line 20. Therefore, the position information acquisition unit 16 can identify the attachment position P2 (step ST24).

As mentioned above, in Embodiment 2, the correspondence relationship between the threshold thr3 and positions P1 and P2 corresponds to position specifying data.

Subsequently, the position information acquisition unit 16 transmits to the control device 100 the information of the identified attachment position P1 or attachment position P2 together with the peripheral device output information output by the power supply/communication unit 13 (step ST25). The aforementioned example in FIG. 5 is provided for the transmitted information, and the attachment position information may be used as an ID of the peripheral device and may be transmitted together with the other information.

Since the control device 100 receives the attachment position information and the peripheral device output information together, as in the above Embodiment 1, the control device 100 can determine from which of the peripheral devices 1, 2 at the positions P1, P2 the peripheral device output information is transmitted. Also, when the ID is transmitted as the attachment position information, the control device 100 may refer to the correspondence relationship between the ID and attachment position preset therein to recognize the attachment position.

Although two peripheral devices are connected in the configuration examples of FIG. 15 and FIG. 16, two or more peripheral devices may be connected. In the case of the configuration example of FIG. 15, for example, the line branched from the bus line 20 toward the peripheral device 2 is branched to a further different or third peripheral device (not shown) arranged at an attachment position P3, and a resistor 41 is arranged on that line. In this manner, the voltage of the third peripheral device becomes lower than the voltage of the other peripheral devices 1, 2. Therefore, the position information acquisition unit 16 may determine the positions P1 to P3 by using the threshold thr3 and a predetermined threshold thr4 (thr3>thr4). By way of an example, when the voltage at the terminal 18 is higher than each of the thresholds thr3 and thr4, the attachment position P1 is determined; when the threshold thr3 is equal to or higher than the voltage at the terminal 18 and the voltage at the terminal 18 is higher than the threshold thr4, the attachment position P2 is determined; when each of the thresholds thr3 and thr4 is equal to or higher than the voltage at the terminal 18, the attachment position P3 is determined.

It is noted that since the power supply unit of the power supply/communication unit 13 can usually allow a certain extent of variation in voltage, as long as the variation is within that extent, there is no problem in the operation of the peripheral devices 1, 2 even if the supply voltage is lowered with a voltage drop element such as the resistors 40, 41.

Also, although voltage is used as the physical amount of the connector terminal 10 in the above description, current may be used instead.

From the above, in the parallel bus system according to Embodiment 2, each of the peripheral devices 1, 2 is configured to include: the connector terminal 10 receiving the supply of a physical amount different from that at the connector terminal of the other peripheral device via the bus line 20 connected to the control device 100 or the bus line 20 branched from the corresponding bus line 20; and the position information acquisition unit 16 that determines the attachment position of the corresponding peripheral device based on the physical amount (e.g. voltage) supplied to the connector terminal 10, and informs the control device 100 of the determination result; especially, the connector terminal 10 provided for the corresponding peripheral device is configured to receive the supply of the physical amount different from that at the connector terminal of the other peripheral device via a voltage drop element such as the resistor 40 connected on the bus line 20 branched from the bus line 20 connected to the control device 100.

For this reason, the position information acquisition unit 16 can determine the attachment position of the corresponding peripheral device based on the physical amount of the connector terminal 10 by connecting the connector terminal 10 to the bus line 20 connected to the control device 100, or to the bus line 20 branched from the corresponding bus line 20 and connected to the resistor 40. Also, as in the above Embodiment 1, there is also provided the advantages of the parallel bus such as the low wiring loss, and the reduced number of connector terminals of the peripheral device. Further, an employment of such a peripheral device can provide a parallel bus system in which the control device side also can recognize the attachment positions of the peripheral devices.

However, the configuration of the above Embodiment 2 may also be combined with that of the above Embodiment 1.

Figure 18:
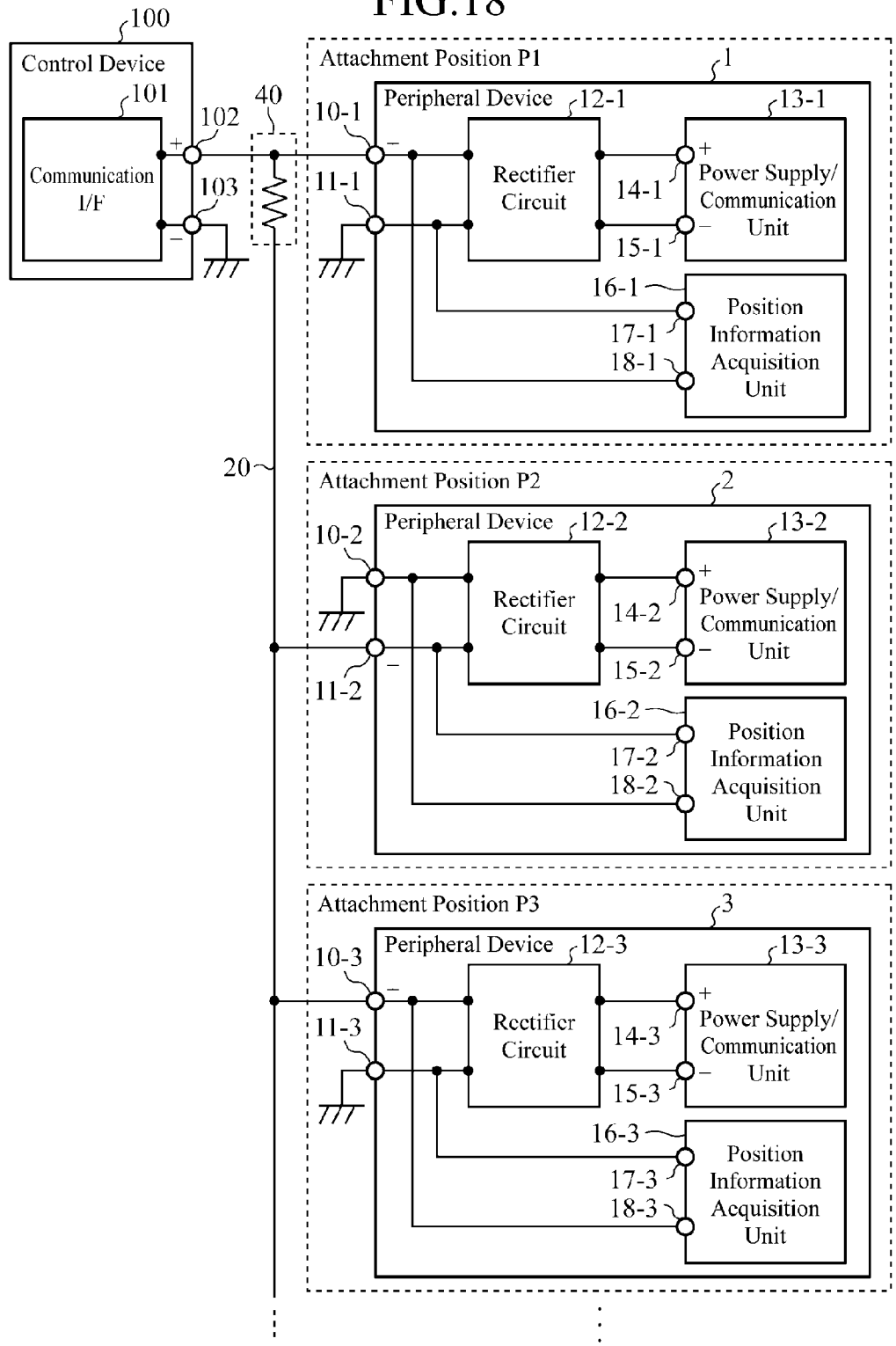
FIG. 18 is a block diagram showing a modification of the parallel bus system according to Embodiment 2 in the invention.
Figure 19:
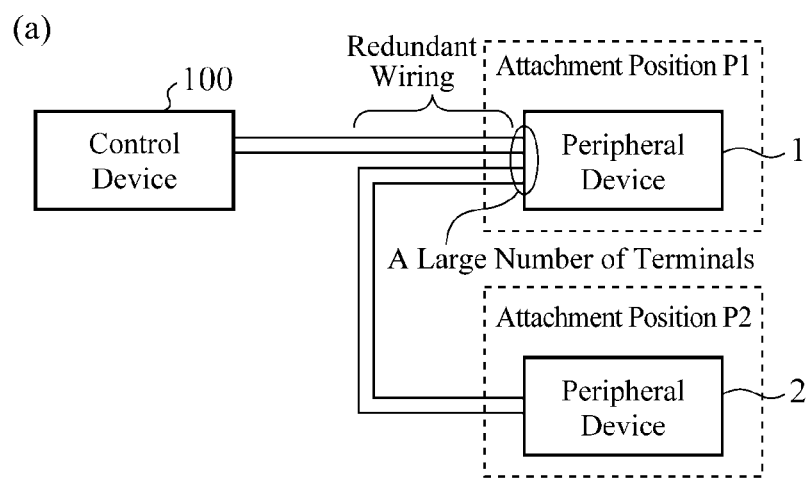
Figure 19:
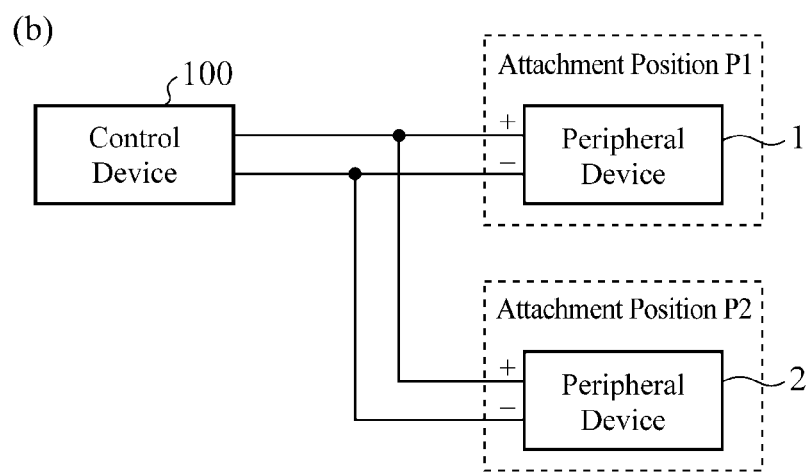

FIG. 18 shows a modification of the parallel bus system according to Embodiment 2, such that the configuration of the above Embodiment 1 is combined with that of Embodiment 2. In FIG. 18, the same or equivalent parts as or to those in FIG. 1 and FIG. 15 are denoted by the same reference numerals, and a description thereof will be omitted. Although in FIG. 18 a peripheral device 3 is installed at an attachment position P3, the number of installed peripheral devices can be further increased. The peripheral device 3 has a connector terminal 10-3 connected to a branched line which is a plus bus line 20 and has a resistor 40 arranged thereon, a connector terminal 11-3 to be grounded, a rectifier circuit 12-3, a power supply/communication unit 13-3 and its terminals 14-3, 15-3, and a position information acquisition unit 16-3 and its terminals 17-3, 18-3.

In the case of this configuration, for example, the position information acquisition unit 16 determines that the connector terminal 10 corresponds to the attachment position P1 or the attachment position P3 when the connector terminal 10 is plus, further compares the voltage levels thereof, and determines the one where the voltage drop by the resistor 40 is larger, namely the one having a lower voltage level, as the attachment position P3, and the one where the voltage drop is smaller, namely the one having a higher voltage level, as the attachment position P1. When the other connector terminal 11 is plus, the unit determines the attachment position P2.

In addition to the above, according to the present invention, within the scope of the invention, a free combination of the embodiments, or a modification of the embodiments in an arbitrary manner, or an omission of arbitrary components in the embodiments is possible.

INDUSTRIAL APPLICABILITY

As described above, the parallel bus system according to the present invention is configured such that the peripheral device determines its attachment position, and therefore it is suitable for use in an acceleration sensor composing an air bag activation system, an ultrasonic sensor composing an obstacle detection system, and the like.

The invention claimed is:

1. A peripheral device to be connected to a control device via a parallel bus, comprising:
   a first terminal for receiving a supply of a physical amount via a bus to be connected to the control device or a corresponding bus branched from the bus to be connected to the control device; and
   a second terminal for receiving a supply of a physical amount via the bus or the corresponding bus, or for being grounded;
   a position information acquisition unit that determines an attachment position of the peripheral device by calculating a physical amount between the first and second terminals,
   wherein the position information acquisition unit determines the attachment position of the peripheral device based on a combination of polarities of the physical amount between the first and second terminals.

2. The peripheral device according to claim 1, comprising:
   a power supply unit receiving supply of power from the terminals; and
   a rectifier circuit arranged between the terminals and the power supply unit to convert the power supplied at the terminals to a normal polarity and to supply the converted power to the power supply unit.

3. The peripheral device according to claim 1, wherein the position information acquisition unit outputs identification information for identifying the attachment position of the peripheral device.

4. The peripheral device according to claim 1, wherein when the physical amount between the first and second terminals exceeds a predetermined range, the position information acquisition unit outputs error information.

5. A parallel bus system comprising:
   the peripheral device according to claim 1;
   a control device; and
   parallel buses, one of which connects the peripheral device to the control device.

6. The parallel bus system according to claim 5, wherein:
   a plurality of peripheral devices with the same specification are connected;
   each of the peripheral devices has a plurality of terminals which are connected to a plurality of bus lines in an arbitrary combination, and receive the supply of physical amounts in a combination different from those at the terminals of another peripheral device; and
   each of the peripheral devices has a position information acquisition unit which determines an attachment position of the corresponding peripheral device based on the combination of the physical amounts supplied to the plurality of terminals.

7. The parallel bus system according to claim 5, further comprising a voltage drop element arranged on a bus included in the parallel buses, wherein the first terminal of the peripheral device receives a supply of a physical amount via the voltage drop element.

* * * * *